March 4, 1930.  H. FORD  1,749,578

OPPOSED PISTON ENGINE

Filed Nov. 26, 1927    2 Sheets-Sheet 1

INVENTOR.
Henry Ford.
BY
C. R. Halbert.
E. L. Davis.
ATTORNEYS.

Patented Mar. 4, 1930

1,749,578

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

OPPOSED-PISTON ENGINE

Application filed November 26, 1927. Serial No. 235,981.

The object of my invention is to make an airplane of simple, strong and light construction.

Still a further object of my invention is to construct an airplane so that the engines may be installed with the lines of the wings whereby the wind resistance of the airplane may be cut down and the strength of the wings relatively increased.

Still a further object of my invention is to construct an engine which will be relatively powerful and which nevertheless will have such proportions that it may be readily installed in the inside of an airplane wing and still the design will be such that the propeller of the airplane may be readily attached thereto.

Still a further object of my invention is to design an engine for an airplane which may be installed within the lines of the wing, and which will have two spaced crankshafts which may be extended out from the airplane wing and which may each have an airplane propeller attached thereto whereby two synchronized propellers may be installed on the wings adjacent to each other.

Still a further object of my invention is to provide an airplane engine adapted to be installed within the lines of the wings of the airplane which may have a pair of spaced parallel crankshafts which will extend from front to rear through the airplane wing and which may each have a propeller at each end thereof.

Still a further object of my invention is to construct an airplane engine adapted to be installed within the wing of an airplane and which comprises one or more cylinders having a piston in each end thereof and spaced parallel synchronized crankshafts connected to said pistons, whereby the engine may be given the proportions proper for installing it within an airplane wing and whereby the weight of the cylinder head and manifold usually provided with an engine may be eliminated or largely decreased.

Still a further object of my invention is to provide an airplane engine designed to be disposed in the wing of an airplane which may be readily connected with a helicopter or vertical lift air screw.

Still a further object of my invention is to provide an engine having one or more cylinders with pistons at each end thereof and spaced parallel crankshafts connected to said pistons, and synchronizing means for said crankshafts, and driving devices connected to said synchronizing means whereby the engine may be particularly adapted for driving a lift screw or helicopter propeller for an airplane.

With these and other objects in view, my invention consists in the arrangement, construction, and combination of the various parts of my improved device as described in the specification, claimed in the claims, and illustrated in the accompanying drawings, in which:

Figure 4 shows a vertical central sectional view taken through one of the cylinders of my engine, and Figure 5 shows a horizontal central sectional view through one section of my improved engine.

Figure 1:
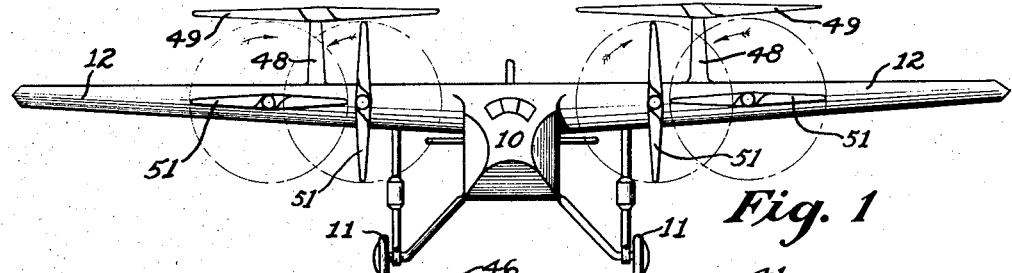
Figure 1 shows a front elevation of an airplane constructed in accordance with my invention.
Figure 3:
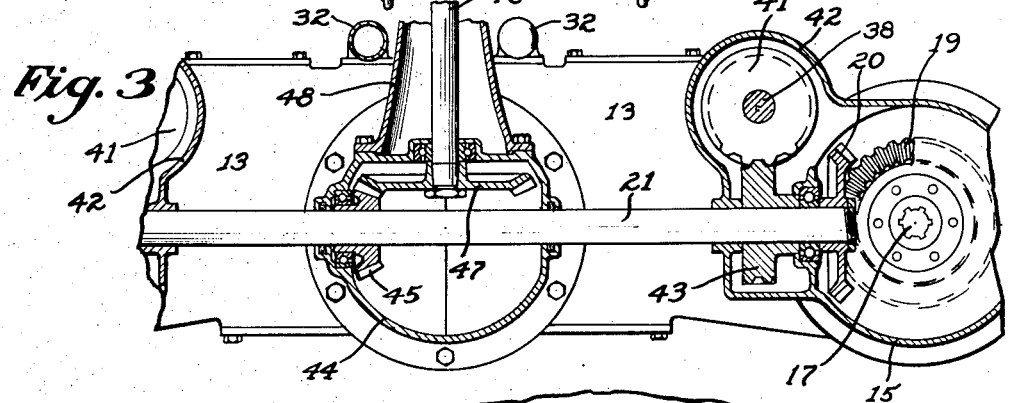
Figure 3 shows a vertical sectional view taken on the line 3—3 of Figure 2.

Referring to the accompanying drawings, I have used the reference numeral 10 to indicate generally the fuselage of an airplane having the supporting wheels 11 and oppositely extending wings 12. The plane illustrated is of the thick wing monoplane type and I have mounted the engines for driving the propellers in the wings, that is to say, within the lines of the wings so that the engines or the accessories therefor will not project from the airplane to vary the stream line thereof and thereby increase the wind resistance. In other words I have mounted my engine in my improved airplane within the wing without materially varying the weight or shape thereof or materially increasing their wind resistance.

Heretofore it has been impractical to mount engines within the wings of an airplane even of the thick wing type such as is here illustrated because the engines used for airplanes were so thick or bulky that they could not be placed within the wings without altering the true stream line thereof.

The engines used with my improved airplane have four double cylinders or the equivalent of eight single cylinders. These cylinders are arranged in pairs in the middle of the engine and there is a crankshaft at either end of the engine. These crankshafts are each connected to a piston in one of each of the cylinders and are geared to run together. The cylinders are cast in pairs in one piece with the crankcases and are divided midway of the pistons, whereby the engine may be said to be constructed of four main like castings.

Figure 2:
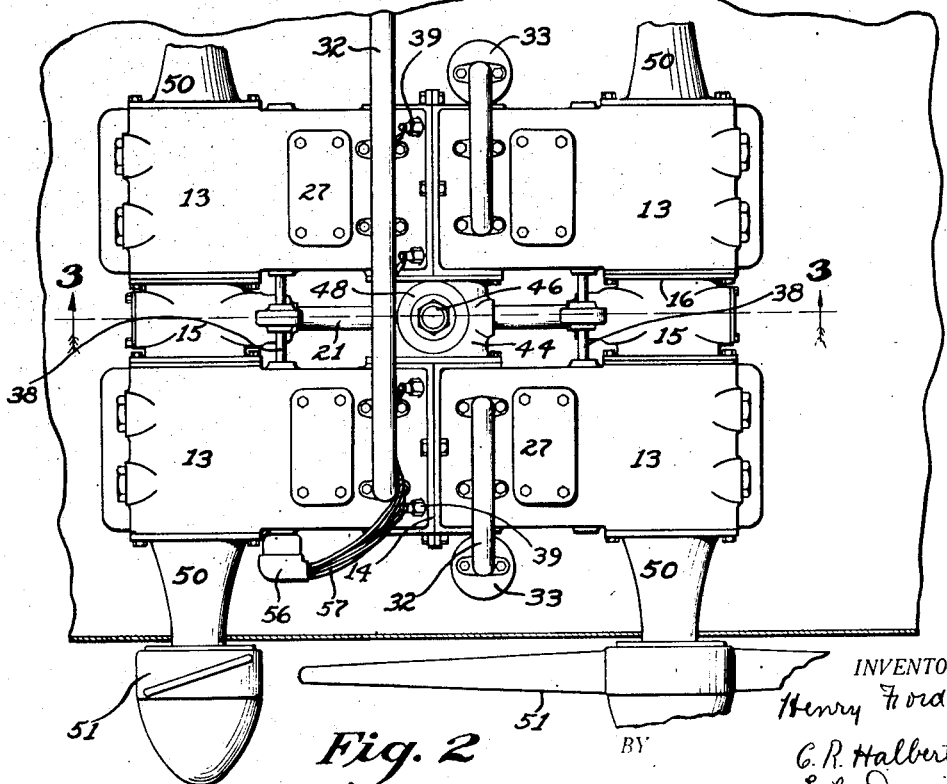
Figure 2 shows a top view of a portion of an airplane wing having my improved engine installed therein, the upper skin being broken away to illustrate the installation of my improved engine.

By referring to Figure 2, it will be seen that I have given the reference numeral 13 to these four like castings each comprising a crankcase and two cylinder halves. Each casting is provided with flanges 14 whereby the cylinder halves may be secured together to form a unitary assembly. The two pairs of cylinders formed from each pair of castings 13 are connected together by two tubular housings 15 at the ends thereof, these housings 15 being secured to the ends of the castings 13 by the flanges 16. A crankshaft 17 having two throws is disposed in each of the castings 13 and one end of each of these crankshafts 17 extends into the adjacent tubular housing 16. Here these crankshafts are connected together by a coupling member 18. One of the crankshafts is provided with a bevel gear 19 which meshes with a second bevel gear 20 mounted on a longitudinal shaft 21. There is a gear 20 at each end of the shaft 21 whereby it will be seen that all four crankshafts 17 will be forced to rotate in unison and they may be connected together by the couplings 18 so that they will also be synchronous. The crankshafts 17 are connected by the connecting rods 22 with the pistons 23. It will be noted by referring to Figures 4 and 5 that each cylinder has two pistons 23 therein so that an explosion in the center of the cylinder will drive both the pistons 23 therein away from the center of the cylinder. In other words an explosion in any cylinder operates to move two pistons. As the crankshafts 17 are synchronized it will be seen that these pistons 23 in each cylinder must travel the same distance at the same speed.

The cylinders 24 of the castings 13 are represented with water jacket portions 25. The water jacket passages 25 are provided with clean out drain plates 27 which are removably secured to the castings 13 by screws 28 so that these cooling passages may be cleaned or drained. Each casting 13 is also provided with bolting flanges 26 whereby it may be secured to a suitable support such as the spars in the airplane wings.

The upper portions of the castings 13 above each cylinder 24 are provided with an extension designed to receive a valve 29 which has the stem 30. An inlet or exhaust passage 31 is extended through this upper part of the castings and opens upwardly therefrom so that an exhaust or inlet manifold 32 may be secured thereto. In the engine herein disclosed, the left hand manifold 32 as illustrated in Figure 2 is the exhaust manifold and the right hand manifolds 32 are the intake manifolds, each of these latter being connected to a carburetor 33. I do not think that this engine should be necessarily limited to the particular manifold construction shown but suggest that this construction is very compact and of light weight as well as being very efficient. Each valve 29 has the stem 30 thereof slidably mounted in the bushing 34 which is removably secured in the casting 13. A spring 54 combined with a washer 55 keeps the valve 29 normally yieldingly closed. A valve tappet construction 35 is mounted in the casting 13 in position to coact with the end of the valve 29 and the roller 36 of the tappet 35 co-acts with a cam 37 on the camshaft 38. A spark plug 39 is also set in two of the castings 13 in position adjacent to the valve 29.

The castings 13 are extended upwardly around the valve operating mechanism to form the valve inspection chamber 52 which has the cover plate 53 thereon. This construction enables the valve operating mechanism to be amply protected and still readily accessible for adjustment when necessary.

One camshaft 38 extends into each casting 13 and each camshaft 38 is designed to be driven by a worm wheel 41 which is mounted in an extension or bell 42 of the housing 15. This worm wheel 41 is in turn driven by the worm 43 which is fixed on the shaft 21. As will be seen from the drawings there is a camshaft 38 at each end of the engine, whereby the operation of the camshaft and the valves may be as simple as possible, and rocker arms, etc. are unnecessary.

The pairs of castings 13 are connected by a housing 44 intermediate of the housings 15. The shaft 21 extends through this housing 44 and the bevel gear 45 is secured to the shaft 21 just inside of one end of the housing 44. A vertical propeller driveshaft 46 is journaled in the top of the housing 44 and has a bevel gear 47 secured to the lower end thereof whereby the gear 45 may drive the gear 47. A housing 48 surrounds the shaft 46 and extends upwardly through the airplane wing therefrom so that a vertical lift air screw or propeller 49 may be secured to and driven from the upper end of the shaft 46. One of the camshafts is extended through the crankcase and a distributor 56 mounted on the end thereof. Wires 57 connect the distributor with the sparkplugs 39.

Propeller driveshaft housings 50 are secured to each crankcase and extend horizontally therefrom rearwardly and frontwardly so that propellers 51 may be located at all four corners of the engine and outside of the wings. In other words each engine drives four pulling propellers which are all disposed outside of the wings.

Referring to Figure 1 it will be noted that these propellers are so arranged that they extend at right angles to each other whereby their paths of travel may overlap and the overall length of the engine need not be very great while at the same the advantages of double propellers adjacent to each other are secured. By making the propellers at right angles to each other, it will be seen that their effectiveness as air screws will not be greatly impaired by their proximity to each other.

The vertical lift air screw 49 may be utilized if desired for lifting the airplane on the helicopter principle with or without the cooperation of the pulling propellers 51.

Some changes may be made in the arrangement, construction and combination of the various parts of my improved device without departing from the spirit of my invention, and it is my intention to cover by my claims such changes as may reasonably be included within the scope thereof.

I claim as my invention:

1. In an opposed piston engine, four like castings each having a crank case formed at one end and a pair of open ended cylindrical bores extending into said crank case from the other end, means for securing the castings together in pairs each pair consisting of two continuous cylinders and two spaced crank cases thereby forming an engine half, a crank shaft disposed in each crank case, means for securing the engine halves together with the spaced crank shafts of each pair of crank cases aligned with each other, a coupling connecting each pair of aligned crank shafts, and a transverse shaft having each end connected by gears to the crank shafts disposed between the engine halves to synchronize all four crank shafts.

2. In an opposed piston engine, four like castings each having a crank case formed at one end and a pair of open ended cylindrical bores extending into said crank case from the other end, means for securing the castings together in pairs, each pair consisting of two spaced crank cases and a pair of continuous cylinders thereby forming an engine half, a pair of spaced gear housings, a crank shaft disposed in each crank case, means for securing the engine halves to the opposite sides of the gear housings so that the crank shafts which extend into each housing may be aligned, a coupling connecting each pair of aligned crank shafts, a transverse shaft extending between said gear housings, and gearing disposed in said housing connecting the joined crank shafts with the transverse shaft whereby all of said crank shafts may be synchronized with each other.

3. In an opposed piston engine, four like castings each comprising a crank case and one or more cylindrical bores, means for securing said castings together so that each pair will form an engine half consisting of two spaced crank cases and one or more continuous cylinders, a crank shaft disposed in each crank case, a cam shaft disposed in each crank case parallel to the adjacent crank shaft, means for securing the engine halves together with the spaced crank cases aligned, a transverse shaft disposed between the engine halves, suitable gearing connecting the spaced crank shafts with the respective ends of the transverse shaft, and other gearing connecting the transverse shaft with the spaced cam shafts.

4. In an opposed piston engine, a pair of engine halves each consisting of two spaced crank cases and one or more continuous cylindrical bores connecting said crank cases, a crank shaft disposed in each crank case, a pair of cam shafts disposed in each engine half parallel to said crank shafts, a pair of spaced gear housings disposed between said engine halves, a transverse shaft extending between said housings, and suitable gearing disposed in each housing connecting the adjacent end of the transverse shaft with the adjacent crank shafts and connecting the transverse shaft with the adjacent cam shafts to synchronize all of the crank shafts and cam shafts.

November 11, 1927.

HENRY FORD.